United States Patent
Murayama et al.

(10) Patent No.: US 12,105,198 B2
(45) Date of Patent: Oct. 1, 2024

(54) SENSOR CONTROL APPARATUS, VEHICLE, SENSING METHOD, AND COMPUTER READABLE MEDIUM

(71) Applicant: MITSUBISHI ELECTRIC CORPORATION, Tokyo (JP)

(72) Inventors: Shu Murayama, Tokyo (JP); Yohei Miki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 1010 days.

(21) Appl. No.: 17/081,401

(22) Filed: Oct. 27, 2020

(65) Prior Publication Data

US 2021/0041565 A1 Feb. 11, 2021

Related U.S. Application Data

(63) Continuation of application No. PCT/JP2018/023792, filed on Jun. 22, 2018.

(51) Int. Cl.
*G01S 17/42* (2006.01)
*B60W 40/076* (2012.01)
(Continued)

(52) U.S. Cl.
CPC ........... *G01S 17/42* (2013.01); *B60W 40/076* (2013.01); *G01S 17/04* (2020.01); *G01S 17/89* (2013.01); *B60W 2420/408* (2024.01)

(58) Field of Classification Search
CPC .............................. G01S 17/88; B60W 40/076
See application file for complete search history.

(56) References Cited

U.S. PATENT DOCUMENTS

2007/0005218 A1* 1/2007 Ueyama ................ B60W 30/16
701/96
2009/0135047 A1 5/2009 Matsuura et al.
(Continued)

FOREIGN PATENT DOCUMENTS

EP 2 097 770 B1 9/2010
EP 2 889 841 A1 7/2015
(Continued)

OTHER PUBLICATIONS

Machine translation of JP-2010281793-A (Year: 2010).*
(Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57) ABSTRACT

An in-vehicle sensor (10) measures a distance by observing reflected waves of a plurality of signals having radiation angles that are different from each other at least in a perpendicular direction. In a sensor control apparatus (11), a ground detection unit (20) detects the ground based on a measurement result of the in-vehicle sensor (10). A sensor control unit (40), according to a relationship between radiation angles of a plurality of signals from the in-vehicle sensor (10), and the measurement result of the in-vehicle sensor (10), adjusts, of these plurality of signals, radiation angles of at least some signals next time when the at least some signals are radiated from the in-vehicle sensor (10).

12 Claims, 8 Drawing Sheets

(51) Int. Cl.
*G01S 17/04* (2020.01)
*G01S 17/89* (2020.01)

(56) References Cited

U.S. PATENT DOCUMENTS

| | | | | |
|---|---|---|---|---|
| 2009/0312906 A1* | 12/2009 | Bauer | ............... | B60W 40/04 |
| | | | | 701/36 |
| 2012/0221207 A1 | 8/2012 | Nakamura | | |
| 2015/0015384 A1 | 1/2015 | Shima et al. | | |
| 2016/0070000 A1* | 3/2016 | Takasuka | ............... | G01S 17/931 |
| | | | | 356/5.01 |
| 2018/0139368 A1 | 5/2018 | Nakayama | | |
| 2018/0143304 A1* | 5/2018 | Rosenzweig | ........... | G01S 17/10 |
| 2019/0154439 A1* | 5/2019 | Binder | ............... | G01B 11/26 |
| 2019/0204438 A1* | 7/2019 | Matsuda | ............ | G01S 17/93 |
| 2020/0162652 A1 | 5/2020 | Nakayama | | |

FOREIGN PATENT DOCUMENTS

| | | | | |
|---|---|---|---|---|
| EP | 2889641 A1 * | 7/2015 | ............ | G01S 17/42 |
| JP | 5-52934 A | 3/1993 | | |
| JP | 11-118925 A | 4/1999 | | |
| JP | 11326499 A * | 11/1999 | | |
| JP | 2000-57494 A | 2/2000 | | |
| JP | 2000-255319 A | 9/2000 | | |
| JP | 4052496 B2 | 2/2008 | | |
| JP | 2008-126804 A | 6/2008 | | |
| JP | 2009-115628 A | 5/2009 | | |
| JP | 2010281793 A * | 12/2010 | | |
| JP | 2011-70411 A | 4/2011 | | |
| JP | 2011-253241 A | 12/2011 | | |
| JP | 2013-191072 A | 9/2013 | | |
| JP | 2014-203235 A | 10/2014 | | |
| JP | 5634046 B2 | 12/2014 | | |
| JP | 2015-60430 A | 3/2015 | | |
| JP | 2015-75382 A | 4/2015 | | |
| JP | 2015-143979 A | 8/2015 | | |
| JP | 2016-53904 A | 4/2016 | | |
| JP | 2017-5678 A | 1/2017 | | |
| JP | 2017-15409 A | 1/2017 | | |

OTHER PUBLICATIONS

Machine translation of JP-11326499-A (Year: 1999).*
German Office Action for German Application No. 112018007636. 9, dated Feb. 3, 2022, with English translation.
International Search Report, issued in PCT/JP2018/023792, dated Aug. 21, 2018.
Japanese Office Action, issued in Application No. 2019-514838, dated Apr. 23, 2019.

* cited by examiner

SENSOR CONTROL APPARATUS, VEHICLE, SENSING METHOD, AND COMPUTER READABLE MEDIUM

CROSS REFERENCE TO RELATED APPLICATIONS

This application is a Continuation of PCT International Application No. PCT/JP2018/023792, filed on Jun. 22, 2018, which is hereby expressly incorporated by reference into the present application.

TECHNICAL FIELD

The present invention relates to a sensor control apparatus, a vehicle, a sensing method, and a sensor control program.

BACKGROUND ART

Detection of surrounding objects becomes necessary in autonomous driving and in driver assistance functions of automobiles. Various sensors such as a camera, a millimeter wave radar, a laser scanner, or the like are used when detecting an obstacle in a traveling direction of a vehicle. Performance regarding a detectable distance, a detection range, resolution, and the like differ between each sensor depending on properties and specifications of the sensor. Consequently, a type and an attachment position of the sensor are necessary to be determined according to a purpose.

In Patent Literature 1, technology to perform a distance measurement by changing a detection range of a radar device to an upper side when distance data cannot be obtained, and when the distance data cannot be obtained even by doing so, to verify that there is a change in a slope in a downward direction, is described.

CITATION LIST

Patent Literature

Patent Literature 1: JP H11-118925 A

SUMMARY OF INVENTION

Technical Problem

On an uphill slope, since an electronic wave radiated ahead of a vehicle hit the ground in a position close to the vehicle, a substantial detection range is narrowed. In the technology described in Patent Literature 1, however, the detection range is not adjusted while the distance data can be obtained even on the uphill slope.

Regardless of a slope of the ground, the substantial detection range is narrowed when a lower part of the detection range overlaps the ground in a position close to the vehicle or when an upper part of the detection range overlaps in midair, because those overlapping parts do not contribute to sensing.

The present invention aims to increase the substantial detection range.

Solution to Problem

A sensor control apparatus according to one aspect of the present invention includes:

a sensor control unit, according to a relationship between radiation angles of a plurality of signals having radiation angles that are different from each other at least in a perpendicular direction, and a measurement result of an in-vehicle sensor that measures a distance by observing reflected waves of the plurality of signals, to adjust, of the plurality of signals, radiation angles of at least some signals next time when the at least some signals are radiated from the in-vehicle sensor.

Advantageous Effects of Invention

In the present invention, according to a relationship between radiation angles of a plurality of signals from an in-vehicle sensor and a measurement result of the in-vehicle sensor, of the plurality of signals, radiation angles of at least some signals are adjusted next time when the at least some signals are radiated from the in-vehicle sensor. Consequently, according to the present invention, a substantial detection range can be increased.

DESCRIPTION OF EMBODIMENTS

Embodiments of the present invention will be described hereinafter using the drawings. Throughout the drawings, the same or corresponding portions are denoted by the same reference signs. In the description of the embodiments, description of the same or corresponding portions will be suitably omitted or simplified. Note that the present invention is not limited to the embodiments to be described hereinafter, and various modifications are possible as necessary. For example, two or more embodiments of the embodiments to be described hereinafter may be implemented in combination. Alternatively, one embodiment or a combination of two or more embodiments of the embodiments to be described hereinafter may be partially implemented.

Embodiment 1

This embodiment will be described using FIG. 1 to FIG. 9.

* Description of Configuration *

Figure 1:
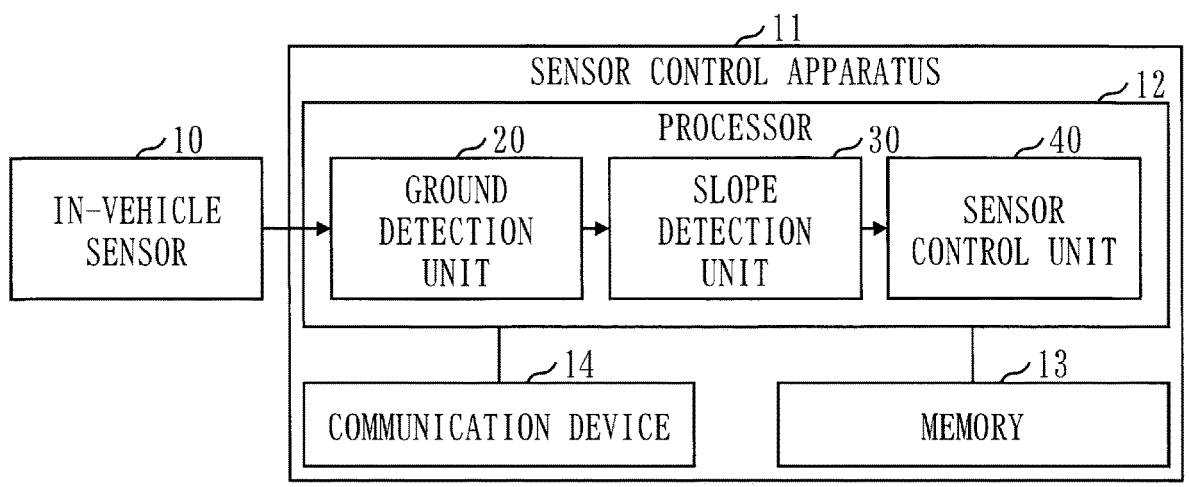
FIG. 1 is a block diagram illustrating a configuration of a sensor control apparatus according to Embodiment 1.
Figure 2:
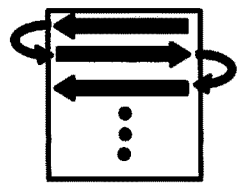
FIG. 2 is a diagram illustrating an order of a scan of an in-vehicle sensor according to Embodiment 1.

A configuration of a sensor control apparatus 11 according to this embodiment will be described by referring to FIG. 1.

The sensor control apparatus 11 is connected to an in-vehicle sensor 10 by wire or wirelessly.

The sensor control apparatus 11 is a computer. The sensor control apparatus 11 is an in-vehicle computer in this embodiment, but the sensor control apparatus 11 may be a server computer arranged in a remote location such as a cloud server and the like. The sensor control apparatus 11 includes a processor 12 and other hardware such as a memory 13 and a communication device 14. The processor 12 is connected to other hardware via signal lines and controls these other hardware.

The sensor control apparatus 11 includes, as functional elements, a ground detection unit 20, a slope detection unit 30, and a sensor control unit 40. Functions of the ground detection unit 20, the slope detection unit 30, and the sensor control unit 40 are realized by software. Specifically, the functions of the ground detection unit 20, the slope detection unit 30, and the sensor control unit 40 are realized by a sensor control program. The sensor control program is a program that makes a computer execute processes performed by the ground detection unit 20, the slope detection unit 30, and the sensor control unit 40 as a ground detection process, a slope detection process, and a sensor control process, respectively. The sensor control program may be provided being recorded in a computer-readable medium or provided being stored in a recording medium, or provided as a program product.

The processor 12 is a device that executes the sensor control program. The processor 12 is, for example, a CPU, a GPU, a DSP, or a combination of some or all of these.

"CPU" is an abbreviation for Central Processing Unit. "GPU" is an abbreviation for Graphics Processing Unit. "DSP" is an abbreviation for Digital Signal Processor.

The memory 13 is a device that stores the sensor control program in advance or temporarily. The memory 13 is, for example, a RAM, a flash memory, or a combination of these. "RAM" is an abbreviation for Random Access Memory.

The communication device 14 includes a receiver that receives from the in-vehicle sensor 10 or from other external devices, data inputted into the sensor control program, and a transmitter that transmits data outputted from the sensor control program to the in-vehicle sensor 10 or to other external devices. The communication device 14 is, for example, a communication chip or an NIC. "NIC" is an abbreviation for Network Interface Card.

The sensor control apparatus 11 may further include an input device and a display as hardware.

The input device is a device that is operated by a user for inputting data into the sensor control program. The input device is, for example, a mouse, a keyboard, a touch panel, or a combination of some or all of these.

The display is a device that displays data outputted from the sensor control program on a screen. The display is, for example, an LCD. "LCD" is an abbreviation for Liquid Crystal Display.

The sensor control program is read into the processor 12 from the memory 13, and executed by the processor 12. Not only the sensor control program but also an OS is stored in the memory 13. "OS" is an abbreviation for Operating System. The processor 12 executes the sensor control program while executing the OS. A part or all of the sensor control program may be built into the OS.

The sensor control program and the OS may be stored in an auxiliary storage device. The auxiliary storage device is, for example, a flash memory. The auxiliary storage device may be a type of a recording medium other than the flash memory, such as an HDD and the like. "HDD" is an abbreviation for Hard Disk Drive. In a case where the sensor control program and the OS are stored in the auxiliary storage device, the sensor control program and the OS are loaded into the memory 13 and executed by the processor 12.

The sensor control apparatus 11 may include a plurality of processors that replace the processor 12. These plurality of processors share execution of the sensor control program. Each processor is, for example, a CPU, a GPU, a DSP, or a combination of some or all of these.

Data, information, signal values, and variable values used, processed, or outputted by the sensor control program are stored in the memory 13, the auxiliary storage device, or a register or a cache memory in the processor 12.

The sensor control apparatus 11 may be configured of one computer, or may be configured of a plurality of computers. In a case where the sensor control apparatus 11 is configured of a plurality of computers, the functions of the ground detection unit 20, the slope detection unit 30, and the sensor control unit 40 may be realized by being distributed to each computer.

* Description of Operation *

Operation of the in-vehicle sensor 10 and the sensor control apparatus 11 according this embodiment will be described by referring to FIG. 2 to FIG. 9, in addition to FIG. 1. By combining the operation of the in-vehicle sensor 10 and the operation of the sensor control apparatus 11, a sensing method according to this embodiment is realized.

The in-vehicle sensor 10 may be any type of sensor provided that the sensor measures a distance to a reflection point by observing reflected waves of a plurality of signals having radiation angles that are different from each other at least in a perpendicular direction, but in this embodiment, the in-vehicle sensor 10 is a sensor of a laser scanner system, specifically, LiDAR. "LiDAR" is an abbreviation for Light Detection and Ranging.

Figure 3:
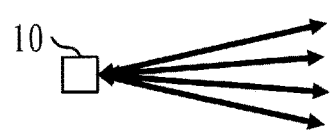
FIG. 3 is a diagram illustrating a radiation direction of a laser from the in-vehicle sensor according to Embodiment 1.
Figure 4:
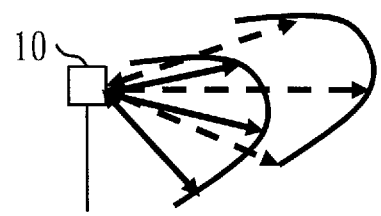
FIG. 4 is a diagram illustrating a reach range of a laser from the in-vehicle sensor according to Embodiment 1.

The in-vehicle sensor 10 transmits a laser signal to a determined position within a scan range that is determined in length and width, and in a determined order. The in-vehicle sensor 10 measures the distance to the reflection point based on time until a reflected light of the laser signal returns. The scan range and a scan order vary depending on device specifications. As an example of the scan order, a system as in FIG. 2 where while a scan is performed in order in a horizontal direction, the scan turns around at an end point in a perpendicular direction, can be given. The in-vehicle sensor 10 obtains information of a distance based on a reflected light in each scan position as described above, and generates a three-dimensional image including distance information based on the distance information and the like that is adjacent in horizontal and perpendicular directions. When the scan is to be performed as in FIG. 2, since a light source of a laser is generally available in one place, the laser is radiated in a way that the laser draws an arc in horizontal and perpendicular directions from one point. FIG. 3 is a diagram illustrating radiation by the in-vehicle sensor 10 from a lateral direction and is illustrating that the scan range increases in a vertical direction radially. When the in-vehicle sensor 10 is arranged in a certain height from the ground, the laser radiated in a diagonally downward direction reflects off the ground and returns. Consequently, by obtaining reflection in a certain distance where the laser radiated in the diagonally downward direction increases in an arc as in FIG. 4, the ground detection unit 20 can find a position of the ground. That is, the ground detection unit 20 detects the ground based on a measurement result of the in-vehicle sensor 10. In FIG. 4, an arc that surrounds a plurality of arrows of solid lines indicates that the plurality of signals radiated in certain angles in a vertical direction spread in an arc, and an arc that surrounds a plurality of arrows of dotted lines indicates that the plurality of signals radiated in radiation angles that are upward in a vertical direction spread more in an arc than the radiation angles of signals corresponding to the arrows of solid lines.

Figure 5:
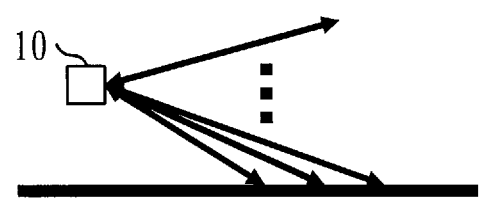
FIG. 5 is a diagram illustrating a measurement distance of the in-vehicle sensor according to Embodiment 1.
Figure 6:
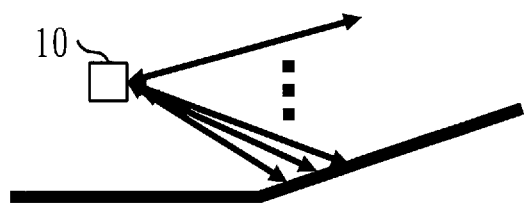
FIG. 6 is a diagram illustrating a measurement distance of the in-vehicle sensor according to Embodiment 1.

The slope detection unit 30 finds a slope of a road based on a detection result of the ground obtained in the ground detection unit 20. Specifically, the slope detection unit 30 detects a slope of the ground, the ground being detected by the ground detection unit 20, based on a relationship between the radiation angles of the plurality of signals from the in-vehicle sensor 10 and the measurement result of the in-vehicle sensor 10. FIG. 5 and FIG. 6 illustrate reflection from the ground to the in-vehicle sensor 10 arranged in a certain height from the ground. In both FIG. 5 and FIG. 6, of lasers extending radially in the diagonally downward direction from a radiation position, the laser that is in a lower part is reflecting off the ground sequentially according to an angle. Between FIG. 5 and FIG. 6, however, detection distances of radiated lights adjacent in a perpendicular direction differ due to sloping of the ground. It can be seen in FIG. 6 that, since an interval between reflection points on the ground is short, the ground ahead in a traveling direction is a slope in a climbing direction. That is, of the plurality of signals from the in-vehicle sensor 10, for a signal that reflected off the ground, the ground being detected by the ground detection unit 20, the slope detection unit 30 calculates a distance between the in-vehicle sensor 10 and the reflection point as a measurement distance, for each signal. Then, the slope detection unit 30 calculates a ratio of a difference in the measurement distances between signals to a difference in the radiation angles between signals, and when the ratio calculated this time becomes smaller than a ratio calculated previously, the slope detection unit 30 verifies that the slope of the ground, the ground being detected by the ground detection unit 20, increased in an uphill direction. In the examples in FIG. 5 and FIG. 6, while the slope detection unit 30 verified that the ground was level when the ratio was calculated previously as in FIG. 5, the slope detection unit 30 verifies that the slope of the ground is an uphill slope when the ratio is calculated this time as in FIG. 6.

In this embodiment, the slope detection unit 30 verifies whether or not a slope of the ground has turned in the uphill direction by comparing the ratio calculated this time with the ratio calculated previously, but the slope detection unit 30 may verify whether or not a slope of the ground has turned in the uphill direction by storing a ratio that is to be a standard in a certain storage area, and comparing the ratio calculated with the ratio stored. The ratio that is to be the standard is, for example, a ratio when the ground is level.

Figure 7:
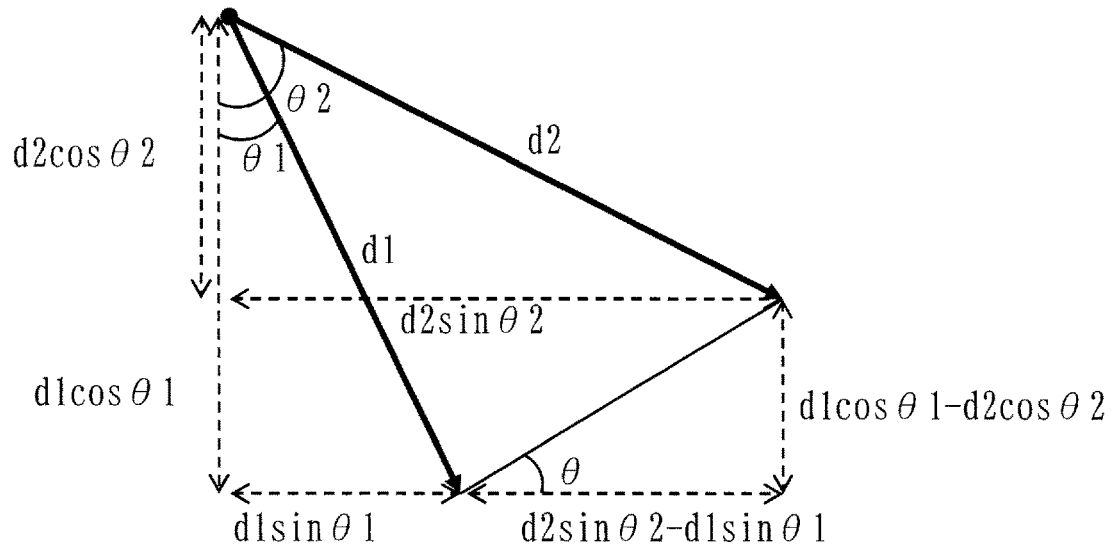
FIG. 7 is a diagram illustrating a calculation method of a slope by the sensor control apparatus according to Embodiment 1.

In this embodiment, the slope detection unit 30 also calculates a slope θ of the ground based on the measured distance between the signals and the radiation angle. An example of a calculation method of the slope θ is illustrated in FIG. 7. By having the radiation angles of two signals radiated from the in-vehicle sensor 10 represented as θ1 and θ2, and the distance to the reflection point calculated based on time from when the two signals are radiated and return reflecting off the ground represented as d1 and d2, the slope θ of the ground can be found by a calculation formula hereinafter set forth.

$$\theta = \tan^{-1}((d1 \cos \theta 1 - d2 \cos \theta 2)/(d2 \sin \theta 2 - d1 \sin \theta 1))$$

As described above, the sensor control apparatus 11 can calculate the slope of the ground positioned in a radiation direction based on the radiation angle of the signal radiated and the measurement distance before a vehicle 90 approaches an uphill slope or a downhill slope, and the sensor control apparatus 11 can efficiently detect an object positioned on the ground that differs in slope from the ground on which the vehicle 90 travels.

The sensor control unit 40 controls operation of the in-vehicle sensor 10 according to the slope of the road found by the slope detection unit 30.

Figure 8:
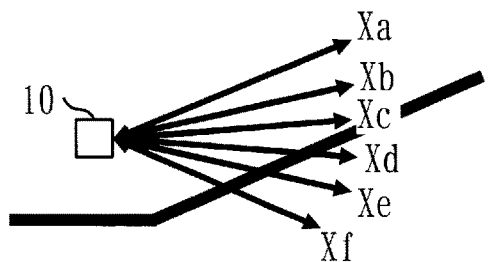
FIG. 8 is a diagram illustrating a detection range of the in-vehicle sensor before a change according to Embodiment 1.
Figure 9:
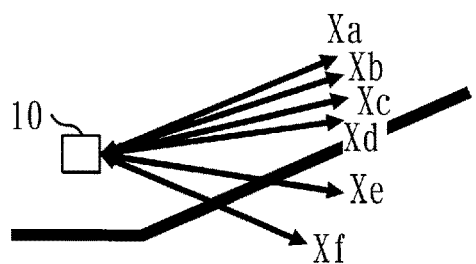
FIG. 9 is a diagram illustrating a detection range of the in-vehicle sensor after a change according to Embodiment 1.

Specifically, the sensor control unit 40, as illustrated in FIG. 8 and FIG. 9, controls the in-vehicle sensor 10 in a way to change the radiation direction of the laser that is normally lined radially in a vertical line in certain regular intervals according to the slope. When the slope is in the climbing direction, with the radiation direction still lined in regular intervals as in FIG. 8, an obstacle in the distance cannot be detected since the laser hits a closest slope, control is performed in a way that density of the radiation direction in a diagonally upward direction increases as in FIG. 9. That is, for example, assuming that an angle of depression direction is positive, when a slope that is uphill is detected by the slope detection unit 30, next time when the signals reflected off the ground, the ground being detected by the ground detection unit 20, are radiated from the in-vehicle sensor 10, the sensor control unit 40 increases the radiation angles of the signals reflected off the ground, the ground being detected by the ground detection unit 20, with an upper limit and a lower limit of the radiation angles staying the same, upward for all or some signals other than the signals that correspond to radiation angles of the upper limit and the lower limit to increase the density of the signals radiated in a distant direction from the ground, the ground being detected by the ground detection unit 20. Specifically, when the slope that is uphill is detected by the slope detection unit 30, the smaller a previous radiation angle is, the more increase in the radiation angle of at least some signals the sensor control unit 40 makes next time when the at least some signals are radiated from the in-vehicle sensor 10.

In FIG. 8, which is before the radiation angle of the signal is changed, each signal is represented as, in order of how large the radiation angle is, Xa, Xb, Xc, Xd, Xe, and Xf. These signals are radiated in equal intervals in the perpendicular direction. In other words, each angle between adjacent signals is equal to another.

When the slope that is uphill is detected by the slope detection unit 30, the sensor control unit 40, as in FIG. 9, changes radiation density of signals with radiation angles of signal Xa which is radiated in the upper limit of the radiation angle and signal Xf which is radiated in the lower limit of the radiation angle staying the same, that is, a radiation range staying the same. In FIG. 9, a radiation angle of signal Xe, which is second smallest after the radiation angle of signal Xf, is the same, and radiation angles of signals Xb, Xc, and Xd are made larger, in other words, the angle of elevation is made larger. In this case, only the radiation angles of signals Xb, Xc, and Xd are made larger and a possibility of signals Xb, Xc, and Xd reflecting off an object on the ground becomes high. And, while a possibility for only signals Xa and Xb reflecting off an object on the ground is high in FIG. 8, a possibility for signals Xa, Xb, Xc, and Xd reflecting off an object on the ground becomes high in FIG. 9, the density of signals radiated in directions other than the direction of the ground increases.

As described above, by changing the radiation density of signals radiated in the perpendicular direction, an object ahead that is only a certain distance away can be detected accurately even on an uphill slope, and a detection range can substantially be increased, more than the conventional.

In FIG. 9, six signals, Xa, Xb, Xc, Xd, Xe, and Xf are radiated, but number of signals can be more or less than that.

In FIG. 9, the radiation angle of signal Xa which is the upper limit of the radiation angle is unchanged, the radiation angles of signal Xb, which is second largest in radiation angle after signal Xa, and below are made to increase, but without changing the radiation angle of signal Xb or of signals Xb and Xc, a radiation angle of a signal with a smaller radiation angle than those may be made to increase. Similarly, in FIG. 9, the radiation angle of signal Xf which is the lower limit of the radiation angle and the radiation angle of signal Xe, the radiation of which is second smallest after signal Xf, are unchanged, but the radiation angle of signal Xe may also be increased, or the radiation angle of signal Xc may be increased without changing the radiation angles of signals Xf, Xe, and Xd. In other words, of the plurality of signals radiated in the perpendicular direction, radiation angles of "at least some signals" may be made to increase. "Some signals" are, in the example of FIG. 9, remaining signals excluding from a first to an Nth signal counted in an order of how small the radiation angle is, and from a first to an Mth signal counted in an order of how large the radiation angle is. Each of N and M is an integer equal to or greater than 1.

With regard to each signal, an amount of increase in a radiation angle may be determined according to a radiation angle before the increase. As an example, the smaller the radiation angle before the increase, the more increase in the radiation angle may be made. Giving FIG. 8 and FIG. 9 as examples, before the increase in the radiation angle, signal Xd is smaller in radiation angle than signal Xb. By making the amount of increase in the radiation angle of signal Xd greater than the amount of increase in the radiation angle of signal Xb, signal Xd which is closer to the ground is radiated in a direction which is not the direction of the ground. As for signal Xb, when a radiation amount is increased in an equal amount as the increase in the radiation amount of signal Xd, signal Xb is radiated in a direction that is excessively far from the ground and there is a possibility that signal Xb will travel past above an object, not reflecting off the object. By not making the radiation angle of signal Xb increase as much as the increase in signal Xd, signal Xb will not be facing excessively in the direction that is far from the ground, and will be able to detect the object positioned on the uphill slope, only a certain distance away from the vehicle 90. As described above, by increasing the density of the signals, accuracy of object detection can be made higher.

According to a degree of slope that the slope detection unit 30 detected, for example, to a gradient ratio or an angle, the number of signals for increasing the radiation angle may be determined or an amount of increase in the radiation angle of each signal may be determined. For example, detection of an object farther away can be performed efficiently when the number of signals for increasing the radiation angle is increased and the amount of increase in the radiation angle for each signal is made larger, the larger the gradient ratio.

Figure 10:
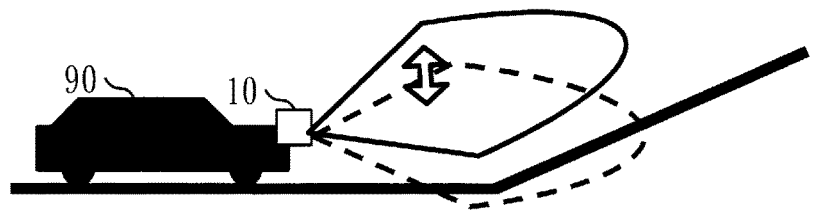
FIG. 10 is a diagram illustrating a change in a detection range by the sensor control apparatus according to Embodiment 1.

As in the example of FIG. 9, instead of changing radiation density of the in-vehicle sensor 10, end points on a top and a bottom of the radiation range of the in-vehicle sensor 10 may be moved towards the top. That is, when a slope that is uphill is detected by the slope detection unit 30, the sensor control unit 40 may uniformly increase the radiation angle next time when a signal that reflected off the ground, the ground being detected by the ground detection unit 20, is radiated from the in-vehicle sensor 10. FIG. 10 illustrates a detection range of the in-vehicle sensor 10 in the case described above. The in-vehicle sensor 10 is arranged on a front of the vehicle 90 into which the sensor control apparatus 11 is built. The sensor control unit 40 changes the detection range of the in-vehicle sensor 10 by controlling the in-vehicle sensor 10. In FIG. 10, a dashed line indicates a detection range before a change, and a solid line indicate a detection range after a change. When a slope in the climbing direction is detected ahead by the slope detection unit 30, the sensor control unit 40 changes the detection range according to the slope. The amount of increase in the radiation angle may be determined according to the gradient ratio or the angle detected by the slope detection unit 30, and when the amount of increase in the radiation angle is made larger, the greater the gradient ratio or the angle, for example, detection of an object other than the ground can be performed with high accuracy.

In this embodiment, one sensor as the in-vehicle sensor 10 radiates a plurality of lasers with intervals that become wider in the vertical direction as the sensor proceeds in the traveling direction, but as a variation, a plurality of sensors that radiate lasers in a single plane may be combined to configure the in-vehicle sensor 10, and radiation angles of these plurality of sensors may be controlled.

In this embodiment, the detection range is set to exist ahead in the traveling direction, but the detection range may be applied to any direction in which an obstacle is desirably detected.

* Description of Effect of Embodiment *

In this embodiment, according to the relationship between the radiation angles of the plurality of signals from the in-vehicle sensor 10 and the measurement result of the in-vehicle sensor 10, the sensor control unit 40 adjusts, of the plurality of signals, the radiation angle next time when the signal that reflected off the ground, the ground being detected by the ground detection unit 20, is radiated from the in-vehicle sensor 10. Consequently, according to this embodiment, a substantial detection range can be increased without providing a mechanism for moving the in-vehicle sensor 10.

In this embodiment, a slope ahead in the traveling direction is detected, and by setting a radiation direction of the in-vehicle sensor 10 according to the slope, in addition to enabling avoidance of the detection range of the in-vehicle sensor 10 covering a sloping part in a way that detection in the distance cannot be done, the radiation range in an upper part may be increased, and detection of an obstacle can be made easier by raising detection density.

In this embodiment, by obtaining a direction of a slope based on a detection result of the ground by the in-vehicle sensor 10, same as the in-vehicle sensor 10 to detect an object, controlling of the in-vehicle sensor 10 according to the direction of the slope can be done without adding a new device.

In this embodiment, since the detection range can be changed by control of the in-vehicle sensor 10, a mechanism to operate the in-vehicle sensor 10 can be omitted. As a variation, the detection range may be made possible to be changed by arranging the in-vehicle sensor 10 on a camera platform and by moving this camera platform.

According to this embodiment, since switching of a sensing range is performed based on information that the in-vehicle sensor 10 is able to directly obtain, object detection with high accuracy can be made possible that has reflected the present situation in which the vehicle 90 is traveling.

* Other Configurations *

In this embodiment, the functions of the ground detection unit 20, the slope detection unit 30, and the sensor control unit 40 are realized by software, but as a variation, the functions of the ground detection unit 20, the slope detection unit 30, and the sensor control unit 40 may be realized by hardware. With regard to this variation, differences from this embodiment will mainly be described.

Figure 11:
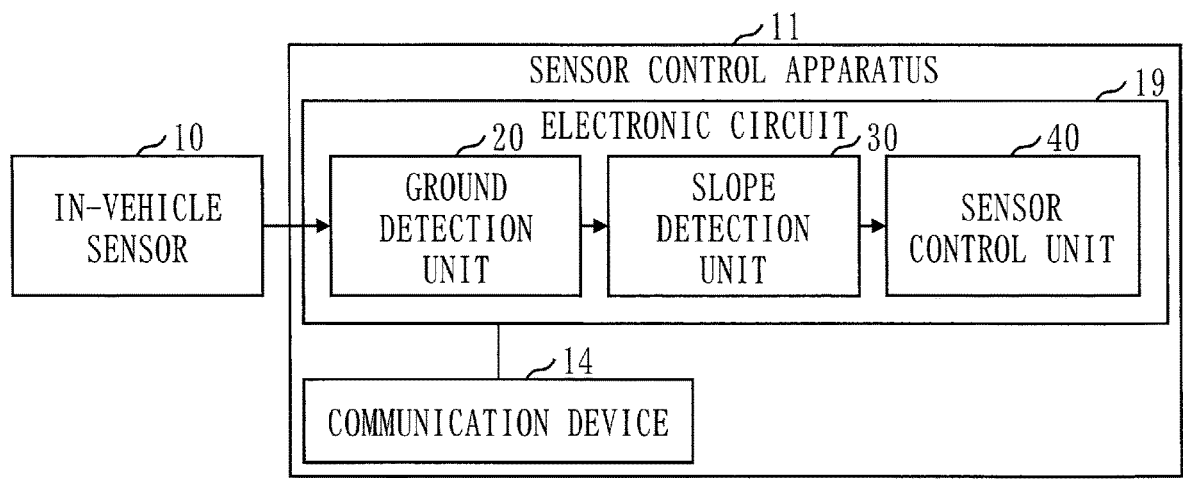
FIG. 11 is a block diagram illustrating a configuration of a sensor control apparatus according to a variation of Embodiment 1.

A configuration of a sensor control apparatus 11 according to the variation of this embodiment will be described by referring to FIG. 11.

The sensor control apparatus 11 includes hardware such as an electronic circuit 19 and the communication device 14.

The electronic circuit 19 is dedicated hardware that realizes the functions of the ground detection unit 20, the slope detection unit 30, and the sensor control unit 40. The electronic circuit 19 is, for example, a single circuit, a composite circuit, a programmed processor, a parallel programmed processor, a logic IC, a GA, an FPGA, an ASIC, or a combination of some or all of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

The sensor control apparatus 11 may include a plurality of electronic circuits that replace the electronic circuit 19. These plurality of electronic circuits, as a whole, realize the functions of the ground detection unit 20, the slope detection unit 30, and the sensor control unit 40. Each electronic circuit is, for example, a single circuit, a composite circuit, a programmed processor, a parallel programmed processor, a logic IC, a GA, an FPGA, an ASIC, or a combination of some or all of these.

As another variation, the functions of the ground detection unit 20, the slope detection unit 30, and the sensor control unit 40 may be realized by a combination of software and hardware. That is, a part of the functions of the ground detection unit 20, the slope detection unit 30, and the sensor control unit 40 may be realized by dedicated hardware and the rest may be realized by software.

Each of the processor 12 and the electronic circuit 19 is a processing circuitry. That is, even in a case where the configuration of the sensor control apparatus 11 is as the configuration illustrated in either one of FIG. 1 and FIG. 11, operation of the ground detection unit 20, the slope detection unit 30, and the sensor control unit 40 are performed by the processing circuitry.

Embodiment 2

With regard to this embodiment, differences from Embodiment 1 will mainly be described using FIG. 12 to FIG. 20.

* Description of Configuration *

Figure 12:
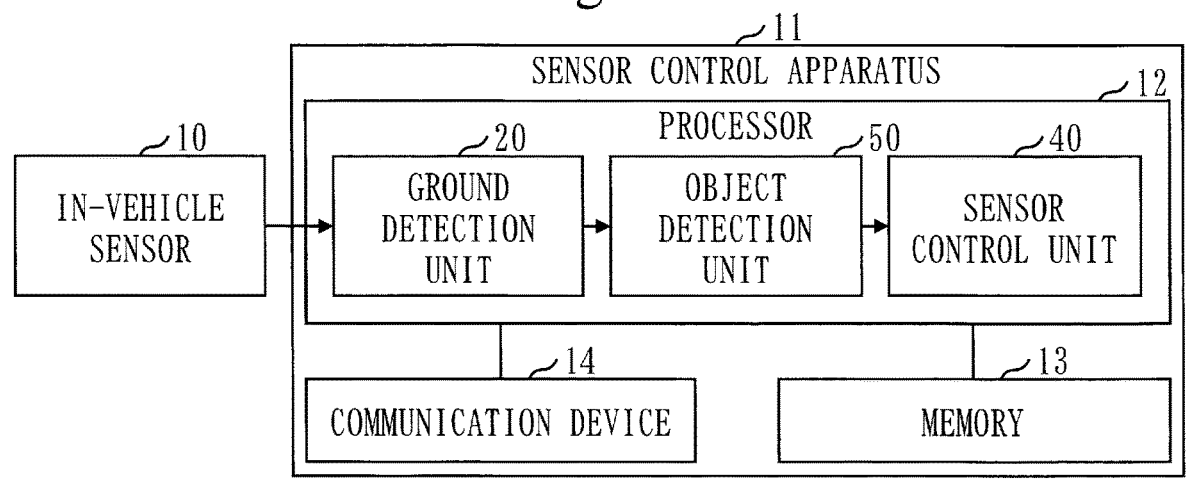
FIG. 12 is a block diagram illustrating a configuration of a sensor control apparatus according to Embodiment 2.

A configuration of a sensor control apparatus 11 according to this embodiment will be described by referring to FIG. 12.

The sensor control apparatus 11 includes, as a functional element, an object detection unit 50 instead of the slope detection unit 30 of Embodiment 1. That is, the sensor control apparatus 11 includes, as functional elements, the ground detection unit 20, the object detection unit 50, and the sensor control unit 40. Functions of the ground detection unit 20, the object detection unit 50, and the sensor control unit 40 are realized by software. Specifically, the functions of the ground detection unit 20, the object detection unit 50, and the sensor control unit 40 are realized by the sensor control program. The sensor control program is a program that makes a computer execute processes performed by the ground detection unit 20, the object detection unit 50, and the sensor control unit 40 as the ground detection process, an object detection process, and the sensor control process, respectively.

* Description of Operation *

Operation of an in-vehicle sensor 10 and a sensor control apparatus 11 according this embodiment will be described by referring to FIG. 13 to FIG. 20, in addition to FIG. 12. By combining the operation of the in-vehicle sensor 10 and the operation of the sensor control apparatus 11, a sensing method according to this embodiment is realized.

In Embodiment 1, the control of the in-vehicle sensor 10 is performed based on a detection result of the slope, but in this embodiment, the control of the in-vehicle sensor 10 is performed using a detection result of an object.

As with the sensor of Embodiment 1, the in-vehicle sensor 10 is a sensor of a laser scanner system, specifically, LiDAR.

Based on time until a laser radiated in a certain direction hits and reflects off an obstacle and returns, the in-vehicle sensor 10 measures a distance to the obstacle in the direction.

The in-vehicle sensor 10 obtains a sensing result as with Embodiment 1, and after the ground detection unit 20 detects the ground based on the sensing result as with Embodiment 1, the object detection unit 50 detects the obstacle. Since the result of the in-vehicle sensor 10 itself does not differentiate between data of reflection from the ground and data of reflection from the obstacle, the object detection unit 50 performs detection of the obstacle in remaining data after removing the data of the reflection from the ground differentiated in the ground detection unit 20.

Since where in a scan range is a position of a lowest part that hit the obstacle can be concluded based on a detection result of the obstacle, the sensor control unit 40 controls the in-vehicle sensor 10 in a way that above the lowest part becomes a detection range of the in-vehicle sensor 10.

An operation example will be described based on an example of outputting of data of the in-vehicle sensor 10 when an obstacle exists ahead.

Figure 13:
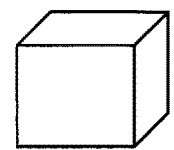
FIG. 13 is a diagram illustrating an obstacle that exists ahead of an in-vehicle sensor according to Embodiment 2.
Figure 13:
Figure 14:
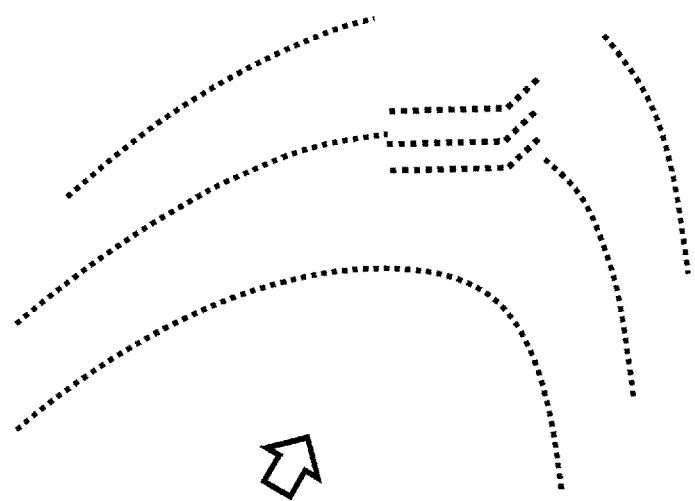
FIG. 14 is a diagram illustrating a detection result when an obstacle exists ahead of the in-vehicle sensor according to Embodiment 2.

FIG. 14 illustrates the in-vehicle sensor 10 outputting data when an obstacle in a shape of a cube as in FIG. 13 exists ahead. In FIG. 14, since the data of reflection from the ground is obtained radially, and the data of reflection from the obstacle is obtained in the shape of a cube, the position of the obstacle is detected in the object detection unit 50 after former data is removed in the ground detection unit 20. Of sensor data that configure the detection position of the obstacle, the object detection unit 50 outputs to the sensor control unit 40 as a lowest point, a scan position that is a lowest part, or the scan position a few rays lower taking into consideration resolution of a line detection width. That is, based on the relationship between the radiation angles of the plurality of signals from the in-vehicle sensor 10 and the measurement result of the in-vehicle sensor 10, the object detection unit 50 specifies, of the plurality of signals, a signal that reflected off the obstacle without reaching the ground, the ground being detected by the ground detection unit 20.

The sensor control unit 40 changes the detection range of the in-vehicle sensor 10 in a way that the scan position obtained comes to the lowest part. That is, the sensor control unit 40 increases a radiation angle next time when a signal is radiated from the in-vehicle sensor 10 according to a radiation angle of a signal corresponding to the lowest point. At a time when verifying in which position the lowest part or the lowest point actually is, since there is a possibility of a lowest part coming to a position lower than the lowest part currently detected, it is desirable for a lowest part or a lowest point to be determined according to a position of the lowest part within a certain time or according to frequency of the position appearing.

Figure 15:
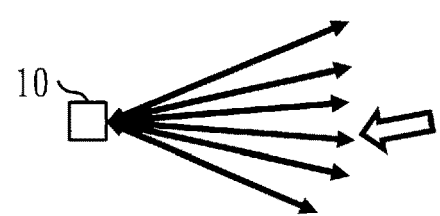
FIG. 15 is a diagram illustrating a detection range of the in-vehicle sensor before a change according to Embodiment 2.
Figure 16:
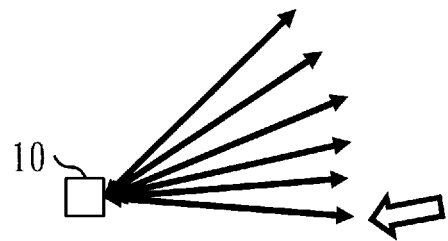
FIG. 16 is a diagram illustrating a detection range of the in-vehicle sensor after a change according to Embodiment 2.
Figure 17:
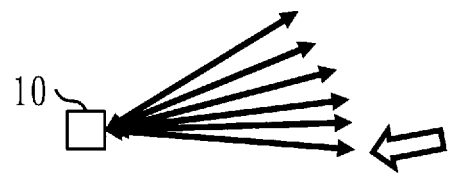
FIG. 17 is a diagram illustrating a detection range of the in-vehicle sensor after a change according to Embodiment 2.

FIG. 15 to FIG. 17 illustrate examples of changes in the scan range. Where FIG. 15 illustrates a scan range before a change, FIG. 16 illustrates an example of moving an upper end and a lower end of the scan range upward when a position of a thick outline arrow is notified as in a lowest point than a previous tier. FIG. 17 illustrates an example of changing density by moving only the lower end of the scan range. Either one of methods of FIG. 16 and FIG. 17 may be adopted. In each of the examples, the sensor control unit 40 increases a radiation angle next time when a signal is radiated from the in-vehicle sensor 10 to an angle equal to or more than a radiation angle of a signal with a radiation angle that is smallest of the signals specified by the object detection unit 50. Or, the sensor control unit 40 verifies whether or not a signal with a radiation angle smaller than the radiation angle of the signal with the radiation angle that is the smallest of the signals specified by the object detection unit 50 is included in the plurality of signals from the in-vehicle sensor 10. And, when the signal with the radiation angle that is smaller is included, the sensor control unit 40 increases the radiation angle next time when the signal with the radiation angle that is smaller is radiated from the in-vehicle sensor 10 according to the radiation angle of the signal with the radiation angle that is the smallest of the signals specified by the object detection unit 50.

The detection range may be changed according to a highest point, and not changing the detection range according to the lowest point. On an upper part of the radiation range extended radially in a vertical direction, places where reflection cannot be detected exist such as the sky or a building outside of the detection range, and the like. Consequently, the object detection unit 50 may conclude that an area where an obstacle cannot be detected within a certain time as an area in midair and notify the sensor control unit 40.

Figure 18:
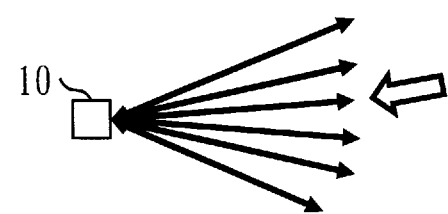
FIG. 18 is a diagram illustrating a detection range of the in-vehicle sensor before a change according to Embodiment 2.
Figure 19:
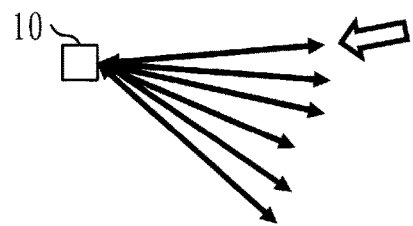
FIG. 19 is a diagram illustrating a detection range of the in-vehicle sensor after a change according to Embodiment 2.
Figure 20:
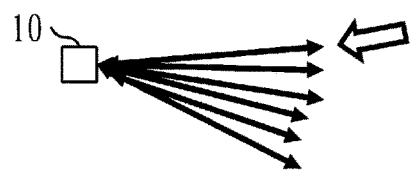
FIG. 20 is a diagram illustrating a detection range of the in-vehicle sensor after a change according to Embodiment 2.

FIG. 18 to FIG. 20 illustrate examples of changes in the scan range. Where FIG. 18 illustrates a scan range before a change, FIG. 19 illustrates an example of moving an upper end and a lower end of the scan range downward when a position of a thick outline arrow is notified as in a highest point than a previous tier. FIG. 20 illustrates an example of changing density by moving only an upper end of the scan range. Either one of methods of FIG. 19 and FIG. 20 may be adopted. In each of the examples, the sensor control unit 40 verifies whether or not a signal with a radiation angle larger than a radiation angle of a signal with a radiation angle that is largest of the signals specified by the object detection unit 50 is included in the plurality of signals from the in-vehicle sensor 10. And, when the signal with the radiation angle that is larger is included, the sensor control unit 40 decreases the radiation angle next time when the signal with the radiation angle that is larger is radiated from the in-vehicle sensor 10, according to the radiation angle of the signal with the radiation angle that is the largest of the signals specified by the object detection unit 50.

* Description of Effect of Embodiment *

In this embodiment, as with Embodiment 1, according to the relationship between the radiation angles of the plurality of signals from the in-vehicle sensor 10 and the measurement result of the in-vehicle sensor 10, the sensor control unit 40 adjusts, of the plurality of signals, the radiation angle next time when the signal that reflected off the ground, the ground being detected by the ground detection unit 20, is radiated from the in-vehicle sensor 10. Consequently, according to this embodiment, a substantial detection range can be increased.

According to this embodiment, by changing the detection range of the in-vehicle sensor 10 based on the detection result of the obstacle, it will be possible to efficiently set a control range of the in-vehicle sensor 10 without adding a new device.

In this embodiment, by determining a detection range with the lowest point of the obstacle as a standard, the detection range of a vast range including a range in the distance can be set efficiently.

* Other Configurations *

Figure 21:
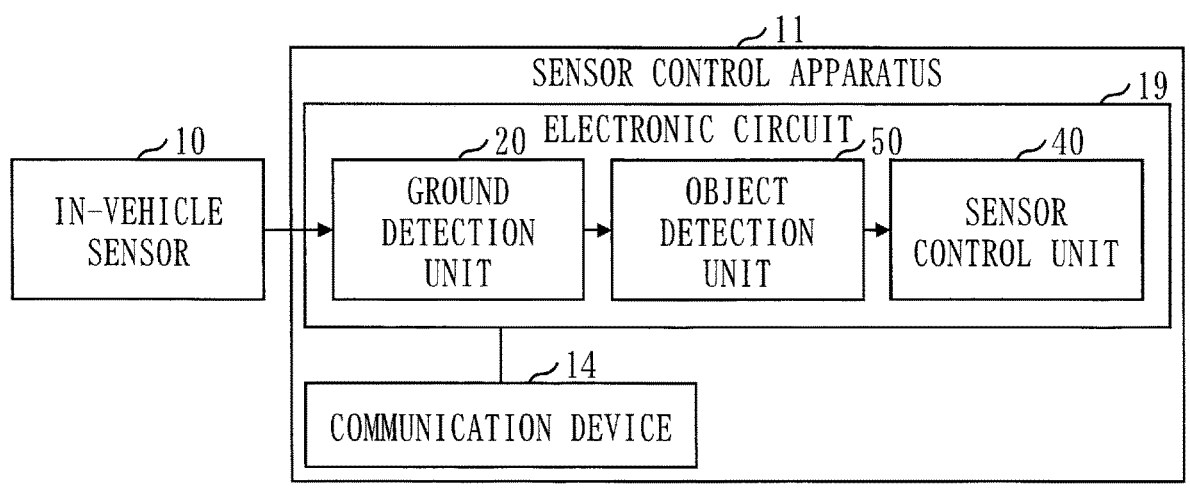
FIG. 21 is a block diagram illustrating a configuration of a sensor control apparatus according to a variation of Embodiment 2.

In this embodiment, as with Embodiment 1, the functions of the ground detection unit 20, the object detection unit 50, and the sensor control unit 40 are realized by software, but as with the variation of Embodiment 1, the functions of the ground detection unit 20, the object detection unit 50, and the sensor control unit 40 may be realized by hardware, as illustrated in FIG. 21. Or, the functions of the ground detection unit 20, the object detection unit 50, and the sensor control unit 40 may be realized by a combination of software and hardware.

Embodiment 3

Figure 22:
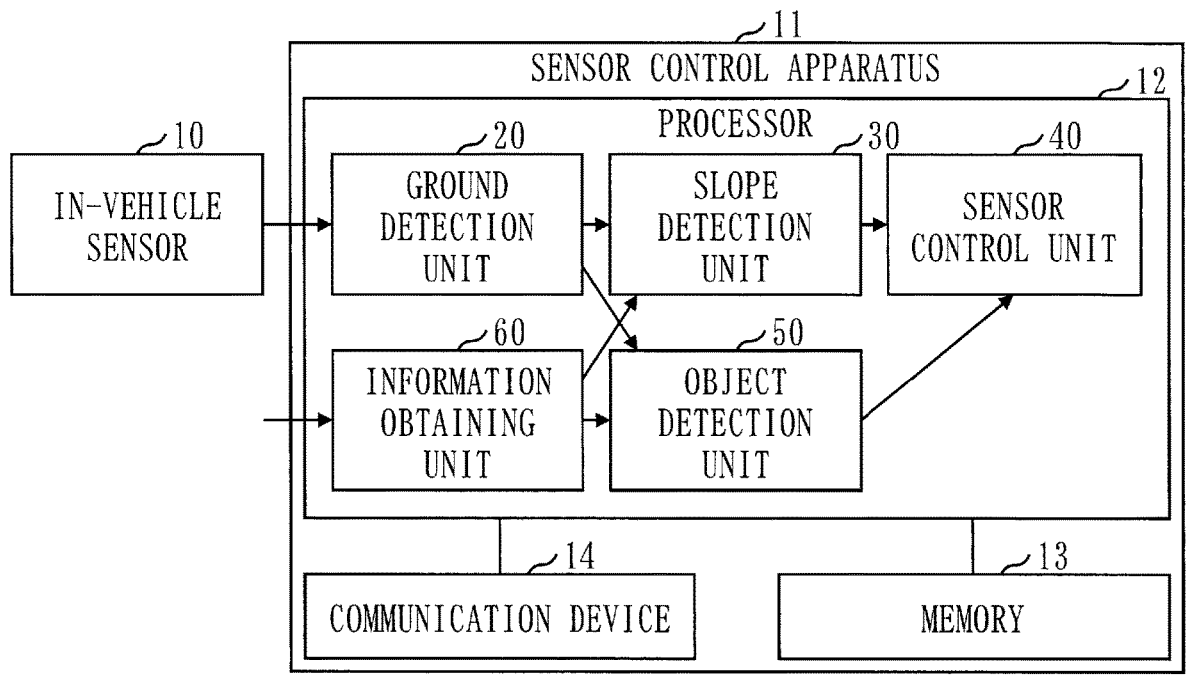
FIG. 22 is a block diagram illustrating a configuration of a sensor control apparatus according to Embodiment 3.
Figure 23:
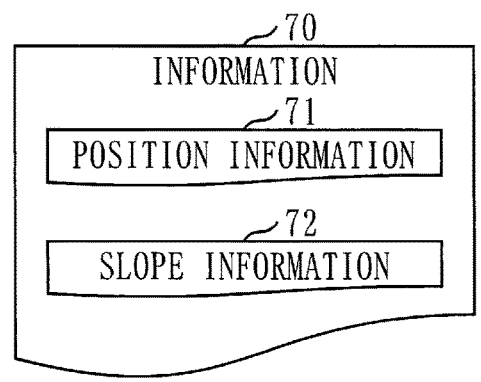
FIG. 23 is a diagram illustrating information to be provided to the sensor control apparatus according to Embodiment 3.

With regard to this embodiment, differences from Embodiment 1 will mainly be described using FIG. 22 and FIG. 23.

* Description of Configuration *

A configuration of a sensor control apparatus 11 according to this embodiment will be described by referring to FIG. 22.

The sensor control apparatus 11 includes, as functional elements, the object detection unit 50 and an information obtaining unit 60, in addition to the ground detection unit 20, the slope detection unit 30, and the sensor control unit 40. Functions of the ground detection unit 20, the slope detection unit 30, the sensor control unit 40, the object detection unit 50, and the information obtaining unit 60 are realized by software. Specifically, the functions of the ground detection unit 20, the slope detection unit 30, the sensor control unit 40, the object detection unit 50, and the information obtaining unit 60 are realized by the sensor control program. The sensor control program is a program that makes a computer execute processes performed by the ground detection unit 20, the slope detection unit 30, the sensor control unit 40, the object detection unit 50, and the information obtaining unit 60 as the ground detection process, the slope detection process, the sensor control process, the object detection process, and an information obtaining process, respectively.

* Description of Operation *

Operation of an in-vehicle sensor 10 and the sensor control apparatus 11 according to this embodiment will be described by referring to FIG. 22 and FIG. 23. By combining the operation of the in-vehicle sensor 10 and the operation of the sensor control apparatus 11, a sensing method according to this embodiment is realized.

In Embodiment 1 and Embodiment 2, the control of the in-vehicle sensor 10 is performed based on sensor information of the in-vehicle sensor 10, but in this embodiment, the control of the in-vehicle sensor 10 is performed according to information 70 from outside.

The information obtaining unit 60 obtains the information 70 from a vehicle different from the vehicle 90 by wireless communication directly or through a road facility or a server, and the like. This information 70 is used in the control of the in-vehicle sensor 10. That is, the information obtaining unit 60 obtains the information 70 to be used in an adjustment of the radiation angle by the sensor control unit 40, from a second vehicle different from a first vehicle, the first vehicle being the vehicle 90 onto which the in-vehicle sensor 10 is installed. The information 70 to be obtained is position information 71 of another car and slope information 72 of its position, illustrated in FIG. 23.

The second vehicle obtains and delivers to surroundings, a slope and a three-dimensional coordinate of a current position of the second vehicle from a gyroscope and a GPS receiver arranged. The vehicle 90 which is also the first vehicle may similarly obtain and deliver to surroundings, a slope and a three-dimensional coordinate of a current position. In the vehicle 90, the information obtaining unit 60 obtains position information 71 of the second vehicle from the second vehicle. By referring to the position information 71 obtained by the information obtaining unit 60, the slope detection unit 30 extracts one or more second vehicles positioned ahead in a traveling direction based on a position relationship between the vehicle 90 and the second vehicle. By referring to the slope information 72 of the second vehicle extracted obtained by the information obtaining unit 60, the slope detection unit 30 detects a slope ahead of the vehicle 90 and notifies the sensor control unit 40. By referring to the position information 71 obtained by the information obtaining unit 60, the object detection unit 50 also extracts one or more second vehicles positioned ahead in a traveling direction based on a position relationship between the vehicle 90 and the second vehicle. By referring to the position information 71 of the second vehicle extracted obtained by the information obtaining unit 60, the object detection unit 50 finds a lowest point of a valid detection range ahead of the vehicle 90 based on a z coordinate of the second vehicle, and notifies the sensor control unit 40. The sensor control unit 40 performs sensor control similar to those in Embodiment 1 and Embodiment 2.

From the second vehicle of how far in the distance the information 70 is to be obtained may be determined as a fixed range or may be determined dynamically according to vehicle speed of the vehicle 90 and processing time of the sensor control process.

Only either one of the slope detection unit 30 and the object detection unit 50 may use the information 70 obtained by the information obtaining unit 60.

* Description of Effect of Embodiment *

In this embodiment, by determining a sensor control range by obtaining the position information 71 and the slope information 72 from a surrounding vehicle, time taken for the sensor control can be shortened since information outside of the detection range of the in-vehicle sensor 10 can be used.

* Other Configurations *

In this embodiment, as with Embodiment 1, the functions of the ground detection unit 20, the slope detection unit 30, the sensor control unit 40, the object detection unit 50, and the information obtaining unit 60 are realized by software, but as with the variation of Embodiment 1, the functions of the ground detection unit 20, the slope detection unit 30, the sensor control unit 40, the object detection unit 50, and the information obtaining unit 60 may be realized by hardware. Or, the functions of the ground detection unit 20, the slope detection unit 30, the sensor control unit 40, the object detection unit 50, and the information obtaining unit 60 may be realized by a combination of software and hardware.

REFERENCE SIGNS LIST

10: in-vehicle sensor, 11: sensor control apparatus, 12: processor, 13: memory, 14: communication device, 19: electronic circuit, 20: ground detection unit, 30: slope detection unit, 40: sensor control unit, 50: object detection unit, 60: information obtaining unit, 70: information, 71: position information, 72: slope information, 90: vehicle.

The invention claimed is:

1. A sensing method comprising:
   measuring, a distance to a reflection point by observing reflected waves of a plurality of signals having radiation angles that are different from each other at least in a perpendicular direction, by an in-vehicle sensor; and
   adjusting, according to a relationship between the radiation angles of the plurality of signals and a measurement result of the in-vehicle sensor corresponding to the distance to the reflection point, of the plurality of signals, radiation angles of at least some signals next time when the at least some signals are radiated from the in-vehicle sensor, and maintaining same values for both an upper limit of a radiation angle and a lower limit of a radiation angle for the corresponding radiation angles of the plurality of signals,
   detecting, the ground based on the measurement result of the in-vehicle sensor, and
   detecting, a slope of the detected ground based on the relationship between the radiation angles of the plurality of signals and the measurement result of the in-vehicle sensor, by a computer, wherein the detecting of the slope of the ground, of the plurality of signals from the in-vehicle sensor, for each signal that reflected off the detected ground, calculates a distance between the in-vehicle sensor and the reflection point as a measurement distance, calculates a ratio of a difference in the measurement distances between a pair of signals to a difference in the radiation angles between the pair of signals, and by comparing the ratio calculated with a ratio that is a standard, detects the slope of the ground.

2. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and detect a slope of the detected ground based on the relationship between the radiation angles of the plurality of signals and the measurement result of the in-vehicle sensor, wherein the processing circuitry of the plurality of signals from the in-vehicle sensor, for each signal that reflected off the detected ground, calculates a distance between the in-vehicle sensor and the reflection point as a measurement distance, calculates a ratio of a difference in the measurement distances between a pair of signals to a difference in the radiation angles between the pair of signals, and by comparing the ratio calculated with a ratio that is a standard, detects the slope of the ground.

3. The sensor control apparatus according to claim 2, wherein the processing circuitry when an uphill slope is detected, adjusts the radiation angles of the at least some signals next time when the at least some signals are radiated from the in-vehicle sensor in a way that density of signals radiated in a direction away from the detected ground, becomes high.

4. The sensor control apparatus according to claim 2, wherein the processing circuitry obtains from a second vehicle that is different from a first vehicle, the first vehicle onto which the in-vehicle sensor is installed, information to be used in an adjustment of the radiation angle.

5. A vehicle comprising:

an in-vehicle sensor; and the sensor control apparatus according to claim 2.

6. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and according to the relationship between the radiation angles of the plurality of signals and the measurement result of the in-vehicle sensor, specify, of the plurality of signals, a signal that reflected off an obstacle without reaching the detected ground, wherein the processing circuitry increases a radiation angle of a signal that reflected off the detected ground, next time when the signal that reflected off the detected ground is radiated from the in-vehicle sensor, according to a radiation angle of a signal with the radiation angle that is smallest of signals specified by an object detector of the sensor control apparatus.

7. The sensor control apparatus according to claim 6, wherein the processing circuitry increases the radiation angle of the signal that reflected off the detected ground next time when the signal that reflected off the detected ground is radiated from the in-vehicle sensor, to an angle equal to or greater than the radiation angle of the signal with the radiation angle that is the smallest of the signals specified by the object detector of the sensor control apparatus.

8. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and detect a slope of the detected ground based on the relationship between the radiation angles of the plurality of signals and the measurement result of the in-vehicle sensor, wherein when an uphill slope is detected, the smaller a previous radiation angle is, the more increase in the radiation angles of the at least some signals the processing circuitry makes next time when the at least some signals are radiated from the in-vehicle sensor.

9. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and detect a slope of the detected ground based on the relationship between the radiation angles of the plurality of signals and the measurement result of the in-vehicle sensor, wherein the processing circuitry when an uphill slope is detected, selects, according to how large the slope detected is, of the plurality of signals, a signal to increase a radiation angle next time when the signal is radiated from the in-vehicle sensor.

10. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and detect a slope of the detected ground based on the relationship between the radiation angles of the plurality of signals and the measurement result of the in-vehicle sensor, wherein when an uphill slope is detected, the larger the slope detected is, the more increase in the radiation angles of the at least some signals the processing circuitry makes next time when the at least some signals are radiated from the in-vehicle sensor.

11. A sensor control apparatus comprising:

processing circuitry to:

according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, adjust, of the plurality of signals, radiation angles of at least some signals next time when the at least some signals are radiated from the in-vehicle sensor, and maintain same values for both an upper limit of a radiation angle and a lower limit of a radiation angle for the corresponding radiation angles of the plurality of signals, detect the ground based on the measurement result of the in-vehicle sensor, and according to the relationship between the radiation angles of the plurality of signals and the measurement result of the in-vehicle sensor, specify, of the plurality of signals, a signal that reflected off an obstacle without reaching the detected ground, wherein the processing circuitry when a signal with a radiation angle larger than a radiation angle of a signal with a largest radiation angle of signals specified by an object detector of the sensor control apparatus is included in the plurality of signals, decreases a radiation angle of the signal with the radiation angle that is larger, next time when the signal with the radiation angle that is larger is radiated from the in-vehicle sensor, according to the radiation angle of the signal with the largest radiation angle of the signals specified by the object detector.

12. A non-transitory computer readable medium storing a sensor control program causing a computer to execute:

a sensor control process, according to a relationship between radiation angles of a plurality of signals having radiation angles that are different from each other at least in a perpendicular direction, and a measurement result of an in-vehicle sensor that measures a distance to a reflection point by observing reflected waves of the plurality of signals, to adjust, of the plurality of signals, radiation angles of at least some signals next time when the at least some signals are radiated from the in-vehicle sensor, and to maintain same values for both an upper limit of a radiation angle and a lower limit of a radiation angle for the corresponding radiation angles of the plurality of signals;

a ground detection process to detect the ground based on the measurement result of the in-vehicle sensor; and a slope detection process to detect a slope of the detected ground based on the relationship between the radiation angles of the plurality of signals and the measurement result of the in-vehicle sensor, wherein the slope detection process, of the plurality of signals from the in-vehicle sensor, for each signal that reflected off the detected ground, calculates a distance between the in-vehicle sensor and the reflection point as a measurement distance, calculates a ratio of a difference in the measurement distances between a pair of signals to a difference in the radiation angles between the pair of signals, and by comparing the ratio calculated with a ratio that is a standard, detects the slope of the ground.

* * * * *